United States Patent [19]

Stoll

[11] Patent Number: 4,858,976

[45] Date of Patent: Aug. 22, 1989

[54] DEVICE FOR HANDLING WORKPIECES

[76] Inventor: Kurt Stoll, Lenzhalde 72, 1300 Esslingen, Fed. Rep. of Germany

[21] Appl. No.: 187,221

[22] Filed: Apr. 28, 1988

[30] Foreign Application Priority Data

Apr. 30, 1987 [DE] Fed. Rep. of Germany ....... 3714388

[51] Int. Cl.[4] .......................... B25J 15/06; B66C 1/02

[52] U.S. Cl. .................................................. 294/64.1

[58] Field of Search ................ 294/64.1, 65; 248/362, 248/363; 269/21; 271/90, 94, 103; 279/3; 901/40

[56] References Cited

U.S. PATENT DOCUMENTS

| | | | |
|---|---|---|---|
| 2,523,157 | 9/1950 | Somma | 294/64.1 X |
| 2,871,053 | 1/1959 | Richter | 294/64.1 |
| 3,230,002 | 1/1966 | Olson | 294/64.1 |
| 3,696,596 | 10/1972 | Wegscheid | 294/64.1 X |
| 4,708,381 | 11/1987 | Lundback | 294/64.1 |

FOREIGN PATENT DOCUMENTS

| | | | |
|---|---|---|---|
| 4840 | 1/1982 | Japan | 294/64.1 |
| 1054269 | 11/1983 | U.S.S.R. | 294/64.1 |

*Primary Examiner*—Johnny D. Cherry
*Attorney, Agent, or Firm*—McGlew & Tuttle

[57] ABSTRACT

A suction holder for workpieces comprises a suction plate of flexible material which is open towards the workpiece on which it is to be placed. A connector extending away from the workpiece from the central part of the suction plate contains a suction duct opening into the suction chamber so that the latter may be connected with the vacuum line. There is a sensor plate adjacent to the suction plate with a spacing between them and there is also a free annular gap between them opening to the outside. On placing the holder on the workpiece the suction plate is deformed towards the sensor plate and rests against it. In the suction duct there is a check valve closing towards the suction chamber and loaded so as to be normally closed. The annular gap and the suction chamber are connected independently from the check valve via a sensor duct with the suction duct section over the check valve. The cross section of the two sensor ducts is smaller than that of the orifice part of the suction duct. If there is a leak into the suction chamber and/or the annular gap external air will be drawn in via the respective sensor duct when the check valve is shut. When the suction chamber and the annular gap are sealed off the check valve opens for drawing the holder against the workpiece.

17 Claims, 2 Drawing Sheets

DEVICE FOR HANDLING WORKPIECES

BACKGROUND OF THE INVENTION

The present invention relates to a suction holder for handling workpieces having means for connection with a vacuum line, a suction plate of flexible material to be placed in engagement with the workpiece so as to delimit a suction chamber between it and the workpiece, the connection means comprising a connector extending from a center part of the plate from the side of it opposite to the side to be engaged with the workpiece, and having a duct therein opening into the suction chamber so as to provide a connection between the chamber and a vacuum line.

Such suction holders are used for handling materials in various applications, for example when workpieces are to be loaded and unloaded. The number of suction holders then used depends on the weight of the workpiece. They are distributed over the work and connected with a common vacuum pump.

Efficient suction engagement with the workpiece depends on the latter having a smooth and even surface and if this is not the case or if the suction holder does not have all its periphery in engagement with the work surface external air will be drawn in so that, dependent on the degree of leaking, the holder will only be able to exert a reduced suction force on the workpiece or even no suction at all. This is more especially serious if the workpiece is held by the holder with a holding force less than the rated one so that the load may be dislodged from the holder, for example when it is jerked. If when using more than one suction holder, only one of them should prove to have a leak, this will then have an effect on all the holders via the lines connecting them together.

SHORT SUMMARY OF THE INVENTION.

Accordingly, one object of the present invention is to devise a suction holder of the initially specified type which has an "all or nothing" holding effect, that is to say that it either holds the workpiece with the full force or does not hold it at all.

A further aim of the invention is to ensure that if one of the holders arranged in a group should draw in air, the action of the other adjoining holders is not interfered with.

In order to achieve these and/or other objects of the invention appearing in the present specification and claims, a concentric cover plate is arranged on the side of the suction plate on the side remote from the chamber with a clearance therebetween so that between the suction plate and the cover plate there is a circumferential annular gap which is open radially to the outside so that when the suction holder is placed on the workpiece the suction plate is deformed towards the cover plate and at least its circumferential zone comes into engagement with the cover plate. There is a normally closed check valve adapted to prevent flow towards the suction chamber and to permit flow out of the suction chamber, the annular gap and the chamber being connected with a section of the suction duct opposite to the suction chamber relative to the check valve independently of the position of the check valve via a first and a second connecting duct, respectively, the two connecting ducts having a smaller cross section than the orifice section of the suction duct extending between the check valve and the suction chamber so that when the suction chamber and/or the annular gap leaks to the outside external air is drawn in via the respective connecting duct, while if the suction chamber and the annular gap are sealed off from the outside the check valve opens to cause the suction holder to be drawn against the workpiece.

If the suction holder has not yet been placed on the workpiece external air will pass via the two connecting ducts into the suction duct so that the pressure relationships at the check valve will cause the same to be kept shut. The same applies also when the suction holder has be placed on the workpiece and the suction plate does not make sealing contact all round on the cover plate and it is possible for external air to be drawn up into the suction chamber. If on the other hand the suction plate makes complete circumferential sealing contact with the workpiece so that it is in sealing contact with the workpiece on the one hand and on the other hand with the cover plate and if there is no hole or the like in the workpiece under the suction plate no external air will flow into the suction duct so that the check valve will open and the workpiece will experience the full suction force of the suction holder. When there is the same degree of vacuum in the suction chamber as in the suction duct the check valve will close again.

Thus the first connecting duct cooperates with the cover plate to detect when the suction plate is making complete circumferential contact with the workpiece. The second connecting duct serves to detect whether the suction chamber is sealed off from the outside. It is only when the two conditions have been fulfilled that the suction holder will perform its inherent function of holding fast to the workpiece.

The second connecting duct has the further function of allowing access of air into the suction chamber when the suction holder is to be removed from the workpiece. In this case the annular gap between the suction plate and the sensor plate simultaneously has air admitted to it.

Since they only function as connectors, the connecting ducts may be made with a very small cross section so that if the suction holder is not mounted properly on the workpiece external air passing into the suction duct will practically have no effect on the action of the any other suction holders.

It will be clear that the biasing action of the check valve to be normally closed will be selected to be large enough to fulfill the valve function indicated above.

All in all it will be seen that the check valve will only open after the suction holder has come into complete sealing engagement with the workpiece so that the latter will only be acted upon when this condition has been achieved, such sucking action on the workpiece then taking place with the full suction force and in the case of a multiple suction holder array only those suction holders will take effect which are in proper contact with the workpiece so that practically no external air will find its way into the system and there is no impairment in the holding force, something to be achieved by the connecting arrangement in accordance with the invention.

GENERAL DESCRIPTION OF THE PREFERRED EMBODIMENTS

Figure 1:
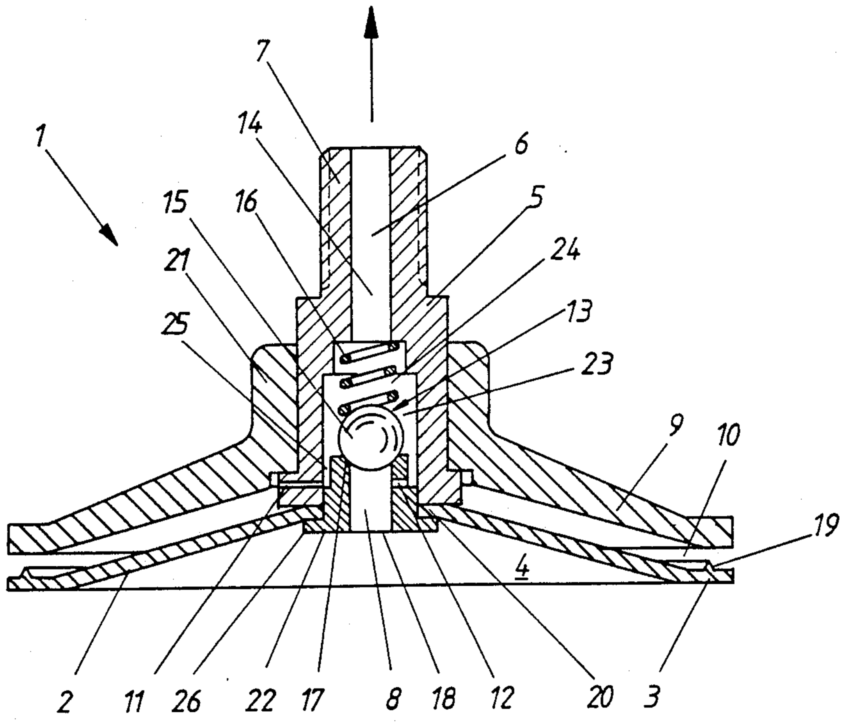
FIG. 1 shows a device for handling workpieces.

The suction holder 1 shown in the figures has a lower suction plate 2 of flexible material which comes into contact with the workpiece or other article (not shown) to be handled when the suction holder is placed thereon. The suction plate 2 has a generally spherical shape with a circular circumference, its outer peripheral part 3 so coming into engagement with the suction plate that it is bent outwards so that it is perpendicular to the axis of the plate. The lower surface of the outer peripheral part 3 is designed in the form of a sealing surface. The suction plate 2 delimits a downwardly open suction chamber 4 which when the device is being used is shut off by the workpiece.

A connector 5 extends upwardly from the central part of the suction plate 2 and has a suction duct 6 formed in it. A vacuum line (not shown) leading to a source of vacuum such as a vacuum pump is able to be connected with the connector 5. For this purpose the connector 5 of the working embodiment has an upwardly directed connector spigot 7 having an external thread and extending upwards in the axial direction. The suction duct 6 extends through the connector 5 and has an orifice 8 adjacent to the suction plate 2 leading into the suction chamber 4. Thus the suction chamber 4 is able to be connected with the vacuum line via the suction duct 6.

A cover plate 9 is arranged concentrically adjacent to the top surface of the suction plate 2 with a space therebetween and it is concentric to the suction place 2 and covers it as far as its outer peripheral part 3. Apart from its central openings provided for holding it, the cover plate 9 is not perforated, just like the suction plate 2. At least the lower surface, facing the suction plate 2, of the cover plate 9 has a generally spherical shape corresponding to the suction plate 2. Between the suction plate 2 and the cover plate 9 there is a peripherally extending annular gap 10, which opens freely outwards in a radial direction and extends radially inwards between the upper surface of the suction plate 2 and the lower surface of the cover plate 9 as far as the connector 5.

If the suction holder is placed on the workpiece the outer peripheral part 3 of the suction plate 2 will be the first part to engage the workpiece. The suction plate 2 will bend or give way even under the weight of the suction holder, the angle of the cone increasing so that at least the outer peripheral part 3 of the suction plate 2 will come into engagement with the lower side of the cover plate 9 with the result that the annular gap 10 will be sealed off at the outside.

In the suction duct 6 there is a normally closed check valve 13 (preferably in the form of a spring-loaded ball valve) shutting off flow towards the suction chamber 4 and permitting flow out of the suction chamber 4. This is independent of the valve setting, that is to say even in the closed setting as well the annular gap 10 is connected via a first connecting duct 11 and the suction chamber is connected via a second connecting duct 12 with the section 14, which is opposite in relation to the check valve 13, of the suction duct 6. In this respect the two connecting ducts 11 and 12 have a smaller cross section than the orifice part 8, extending between the check valve 13 and the suction chamber 4, of the suction duct 6, which is open or closed dependent on the valve setting.

In the condition (as illustrated) prior to application to a workpiece and with the vacuum in operation, that is to say with the vacuum pump running and connected with the suction holder, external air is drawn in through the two connecting ducts 11 and 12 through the outwardly open annular gap 10 and the downwardly opening suction chamber 4. Then the check valve 13 is shut. The two connecting ducts 11 and 12 have an extremely small cross section so that external air is only drawn in through them at a low rate. The force exerted by spring 16 urging the valve member 15 (the valve ball) into the shut position is made to match the diameter of the connecting ducts 11 and 12 or is inversely proportional to them so that despite a degree of vacuum produced over the check valve in the suction duct 6 (such vacuum being small and of the order of approximately minus 0.1 to minus 0.2 bar, although it is naturally possible to have other vacuum levels by designing the suction holder with a different size) the check valve does not open. The main suction opening formed by the orifice 8 thus remains closed as well. The spring of the valve has its one end bearing against a step or shoulder in the suction duct 6.

If the suction holder is now applied to the workpiece it is necessary for the entire periphery of the suction plate 2 to engage the workpiece so that it is pressed against the cover plate 9 all the way round and the annular gap 10 is shut off from the outside as has already been mentioned. It is only when this condition has been fulfilled that no further external air will enter the suction duct via the first connecting duct 11. If the suction plate 2 is furthermore in sealing engagement with the workpiece and if the surface of the workpiece covered by the suction plate 2 does not have any part in communication with the external atmosphere, the suction chamber 4 will be sealed off from the outside so that it is not possible for any external air to be drawn in via the second connecting duct 12 past the check valve 13. There will now be a degree of vacuum, corresponding to the performance of the vacuum pump, in the suction duct section upstream from the check valve 13, since no external air will gain entry so that the valve member 15 will come clear of its valve seat 17 against the force of the spring 16 and the orifice 8, that is to say the main suction opening, will open. The suction chamber 4 is then evacuated as it were until the degree of vacuum in it is the same as in the suction duct. Owing to this degree of vacuum the workpiece is drawn firmly against the suction holder. If the degree of vacuum is the same on both sides of the valve member 15 it is possible for the latter to come to rest on its valve seat again owing to the action of the spring. The degree of vacuum present in the suction chamber 4 is maintained via the second connecting duct 12. If for some reason or other the degree of vacuum in the suction chamber 4 should decrease the valve member 15 will be moved clear of its valve seat 17 again until the same degree of vacuum becomes established as in the suction duct.

If the suction plate 2 is not in complete contact with the workpiece or if the surface under the suction plate 2 is such as to give rise to a leak, external air will be drawn in via the first or the second sensor duct, respectively, as already noted, so that it is not possible for the degree of vacuum necessary for the opening of the check valve 13 to be reached upstream from the latter. Thus it is possible to ensure that the suction holder only effectively engages the workpiece and holds it with the full suction force if there is full circumferential engagement with a surface of the workpiece free of features leading to leaks.

In order to remove the suction holder from the workpiece again, the suction duct 6 is opened to the air, for example by switching over a valve in the suction duct so that via the second connecting duct 12 the suction chamber 4 is filled with air. The suction holder may now be taken off the work. Furthermore simultaneously with this the annular gap 10 is filled with air via the first connecting duct 11 so that owing to its own inherent elasticity the suction plate 2 is moved clear of the sensor plate 9 and moves back into the position shown.

It is convenient if at least the outer circumferential part 3 of the suction plate 2 is made thin like a membrane and if at least here it is made of a rubber-like elastic plastic so that it is able to make snug contact with the sensor plate 9. In the preferred embodiment of the invention the suction plate 2 is entirely in the form of a thin membrane.

The cover plate 9 is made more rigid than the suction plate 2 and forms a support for the suction plate 2 when the suction holder is firmly sucked onto the workpiece. In this respect it is an advantage that the cover plate 9 projects downwards past the opening 18 on the suction chamber side of the suction duct 6. In conjunction with the supporting function of the cover plate this ensures that the suction duct opening 18 is always at a clearance from the surface of the workpiece so that all the surface of the workpiece covered by the suction plate 2 is available for suction action on the workpiece.

In the preferred embodiment of the invention the cover plate 9 is also fashioned of plastic material so that the workpiece is held with some possibility of relative motion. In this respect the cover plate 9 is however made with a thicker wall than the suction plate 2 so that it is stiffer than the latter and is able to fulfill its supporting function.

Figure 2:
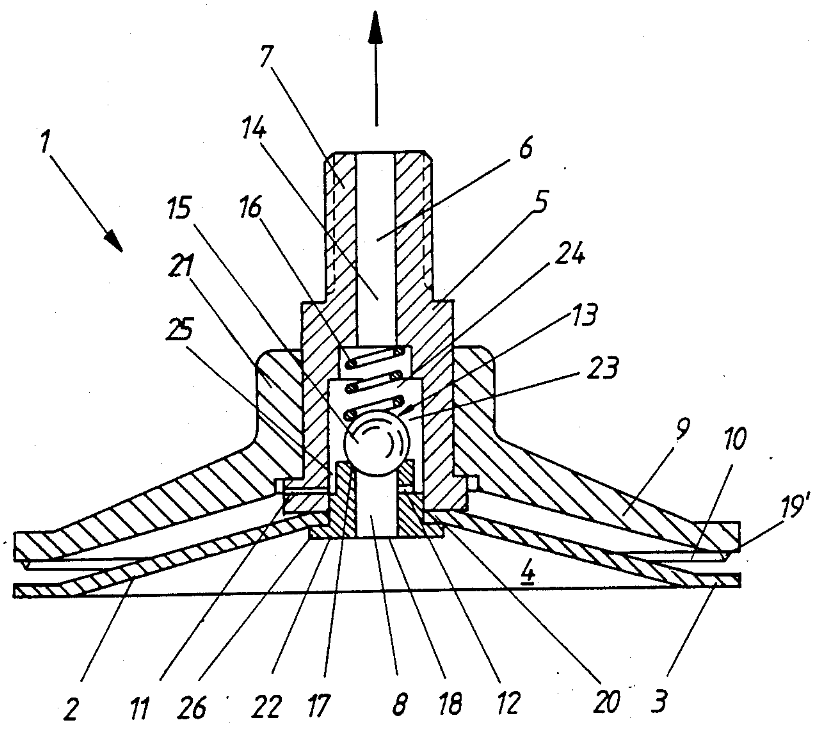
FIG. 2 shows another embodiment of the device for handling workpieces with a different configuration of the connecting duct and, different sealing arrangement for the annular gap.

As shown in FIG. 1*a* circumferential sealing rib 19 is molded on the top side of the suction plate 2 adjacent to its outer edge, that is to say in the outer peripheral zone 3, such rib making sealing contact with the cover plate 9. FIG. 2 shows a second embodiment with a suitable sealing rib on the lower side of the cover plate 9.

The suction plate 2 is a component separate from the connector 5 with a central opening whose edge 20 is secured to the adjacent end of the connector 5. By the same token the cover plate 9 as well is formed by a component with a central opening and separate from the connector 5. Its opening serves for connection with the periphery of the connector 5. Accordingly it will be seen that the cover plate 9 has a central attachement part 21 with an axial length greater than the cover plate 9 as such extending from it, such part having the form of a sleeve and fitting around the connector 5 like a cuff.

The suction plate and the cover plate 9 are thus secured to the connector 5 with a clearance between them. In the part of the connector 5 between the suction plate 2 and the cover plate 9 the first connecting duct 11 extends, its direction preferably being radial.

The connector 5 has an end member 22 containing the orifice 8 of the suction duct 6, such end member being located on the lower end of the remaining connector 5 and fitting into the latter. On the top side of the end member 22 the valve seat 17 for the valve member 15 of the check valve is formed around the upper end of the orifice 8. The second connecting duct 12 extends within the end member 22, such duct 12 forming a sort of bypass shunting the check valve 13. The embodiment shown in FIG. 2 shows it would be possible for the second connecting duct to be present in the form of at least one groove 12' machined into the valve seat surface 17. The connecting duct could also extend through the wall of the end member 22 in an axial direction. On the other hand in the actual embodiment shown the second connecting duct 12 is a radial hole drilled in the end member 22.

It is to be noted at this juncture that the invention is not limited to a single first and single second connecting duct 11 and 12, respectively and that as a matter of principle it would obviously be possible to have more than one such duct.

Since the second connecting duct 12 is arranged under the check valve 13, there is a passage 23 between the valve member 15 and the wall part surrounding it of the suction duct, which in the case of the present working example of the invention is constituted by the separate connector 5. Owing to the passage 23 air is able to pass from the second connecting duct 12 past the valve member 15 into the section 14 of the suction duct and in the reverse direction when the suction holder is removed from the workpiece. A very simple way of making this possible is for the valve ball 15 to be made with a smaller diameter than the suction duct at this point.

The diameter of the end member part having the valve seat 17 is smaller than the diameter of the suction duct section 24 accommodating the check valve 13, such section 24 being widened in the form of a chamber and having inserted from below the end member 22. Accordingly an annular space 25 is formed around this narrower end member part. The second connecting duct 12 extending from the orifice 8 of the suction duct opens into this annular space 25. The connecting duct 12 passes through the narrower end member part in a radial direction. It is convenient if the first connecting duct 11 opens into the annular space 25.

The lower end of the end member 22 has a radially projecting flange 26. The central part 20 of the suction plate is clamped between this radial flange 26 and the end face of the rest of the connector 5 so that the part 20 is held firmly in place.

I claim:

1. A suction holder for handling workpieces comprising:

a suction plate of flexible material to be placed in engagement with a workpiece so as to delimit a suction chamber between said suction plate and the workpiece;

a connector being connectable to a vacuum line, said connector extending from a center part of said suction plate away from the workpiece, said connector having a duct therein opening into the suction chamber providing a connection between said suction chamber and the vacuum line;

a cover plate being arranged on said connector between said suction plate and the vacuum line, said cover plate and said suction plate being disposed to provide a clearance therebetween defining a circumferential annular gap being open radially to the outside, said suction plate being deformed when the suction holder is placed on the workpiece thereby closing said circumferential annular gap;

a normally closed check valve arranged in said connector duct preventing flow toward said suction chamber and permitting flow out of said suction chamber, an orifice part extending between said check valve and said suction chamber;

said circumferential annular gap and said connector duct being connected by a first connecting duct, said suction chamber and said connector duct being connected by a second connecting duct, each of said first and said second connecting ducts having a connecting duct cross section, said orifice part having an orifice part cross section, each of said connecting duct cross sections being smaller than said orifice part cross section so that when one of said suction chamber and said annular gap are not sealed to prevent communication with outside air, air is drawn in via one of said first and said second connecting ducts, and when said suction chamber and said annular gap are sealed off from the outside air said check valve opens to cause the suction holder to be drawn against the workpiece.

2. The suction holder as claimed in claim 1 wherein at least an outer peripheral part of said suction plate is in the form of a thin-walled membrane and is made of rubber-like elastic plastic.

3. The suction holder as claimed in claim 1 wherein said cover plate is made more rigid than said suction plate and forms a support for said suction plate when the suction holder is engaged with the workpiece by suction.

4. The suction holder as claimed in claim 3 wherein said suction plate has a peripheral edge, said cover plate extends towards the workpiece past said peripheral edge.

5. The suction holder as claimed in claim 3 wherein said cover plate is made of an elastic plastic material and has a thicker wall than said suction plate.

6. The suction holder as claimed in claim 1 having a peripheral sealing rib formed on the lower side of said cover plate adjacent to the outer edge of said cover plate.

7. The suction holder as claimed in claim 1 wherein said suction plate is in the form of a component separate from said connector and has a central opening, the border of the central opening being secured on the periphery of said connector.

8. The suction holder as claimed in claim 1 wherein said cover plate is in the form of a component separate from said connector and has a central opening, the border to the central opening being rested on the periphery of said connector.

9. The suction holder as claimed in claim 1 wherein said first connecting duct extends through said connector between said suction plate and said cover plate.

10. The suction holder as claimed in claim 1 wherein said connector includes an end member being adjacent the center part of said suction plate, said end member having a top side opposite said suction plate, said end member having a valve seat for a valve member of said check valve on said top side and having said second connecting duct extending within it, said connector duct having an interior wall, there being a passage between said valve member and said interior wall of said connector duct.

11. The suction holder as claimed in claim 10 wherein said connector duct has an interior diameter, said end member having a first part having a smaller diameter than said connector duct interior diameter so that an annular space is formed around said end member first part, said second connecting duct opening into said annular space.

12. The suction holder as claimed in claim 11 wherein said second connecting duct is formed by a radial hole in said first part of said end member.

13. The suction holder as claimed in claim 11 wherein the first connecting duct opens into said annular space.

14. The suction holder as claimed in claim 10 wherein said end member having a radial flange opposite said top side, said connector having an end face opposite said vacuum line, said suction plate being secured between said radial flange of said end member and said end face of the rest of the connector.

15. The suction holder as claimed in claim 1 wherein said check valve is in the form of a spring-loaded ball valve.

16. A suction holder for handling workpieces according to claim 15, wherein said check valve has a check valve seat, said second connecting duct being formed as at least one groove machined into said check valve seat.

17. The suction holder as claimed in claim 1 wherein a sealing rib is formed on a top side of said suction plate adjacent to its outer edge.

* * * * *